United States Patent
Gustafson et al.

(12) 
(10) Patent No.: US 6,363,585 B1
(45) Date of Patent: Apr. 2, 2002

(54) CORD-LOCKING DEVICE AND A MILKING UNIT REMOVAL DEVICE COMPRISING SUCH A CORD-LOCKING DEVICE

(75) Inventors: Kenneth Percy Birger Gustafson, Södertälje; Leif Börje Johannesson, Tumba, both of (SE)

(73) Assignee: Delaval International AB, Tumba (SE)

(*) Notice: Subject to any disclaimer, the term of this patent is extended or adjusted under 35 U.S.C. 154(b) by 0 days.

(21) Appl. No.: 09/508,939

(22) PCT Filed: Sep. 16, 1998

(86) PCT No.: PCT/SE98/01663

§ 371 Date: Mar. 17, 2000

§ 102(e) Date: Mar. 17, 2000

(87) PCT Pub. No.: WO99/16301

PCT Pub. Date: Apr. 8, 1999

(30) Foreign Application Priority Data

Sep. 17, 1997 (SE) .............................. 9703359

(51) Int. Cl.⁷ .............................. F11G 11/00
(52) U.S. Cl. .................. 24/115 K; 24/115 R; 24/129 R
(58) Field of Search ................. 24/602, 122.6, 24/712.1, 712.2, 115 R, 115 K, 115 A, 115 M, 115 G, 127, 136 R, 136 K, 136 L, 134 R, 134 KB, 134 L; 119/14.08, 14.04; 403/369, 374

(56) References Cited

U.S. PATENT DOCUMENTS

| 4,379,358 A | * | 4/1983 | Wilbrow .................. 24/136 R |
| 4,523,545 A | | 6/1985 | Kummer |
| 4,719,671 A | * | 1/1988 | Ito et al. ................... 24/115 R |
| 4,782,560 A | * | 11/1988 | Keller ....................... 24/136 L |
| 5,553,360 A | * | 9/1996 | Lucas et al. ............... 24/136 K |
| 5,671,508 A | | 9/1997 | Murai |

FOREIGN PATENT DOCUMENTS

| SE | 453217 | 1/1988 |
| WO | WO9317258 | 9/1993 |
| WO | WO9505733 | 3/1995 |

* cited by examiner

*Primary Examiner*—Robert J. Sandy
(74) *Attorney, Agent, or Firm*—Hovey, Williams, Timmons & Collins

(57) ABSTRACT

A cord-locking device for releasably gripping a cord (4), which preferably may be used in a milking machine as a safety coupling. The cord comprises a grip member (12) arranged to receive the cord (4) and to hold releasably by a holding member (13). The grip member (12), held by the holding member (13), is arranged to lock fixedly the received cord (4) by clamping as a consequences of a pulling load applied to the cord (4). The grip (12), when released from said holding member (13), is arranged to enable the release of the received cord (4) from the grip member (12).

18 Claims, 4 Drawing Sheets

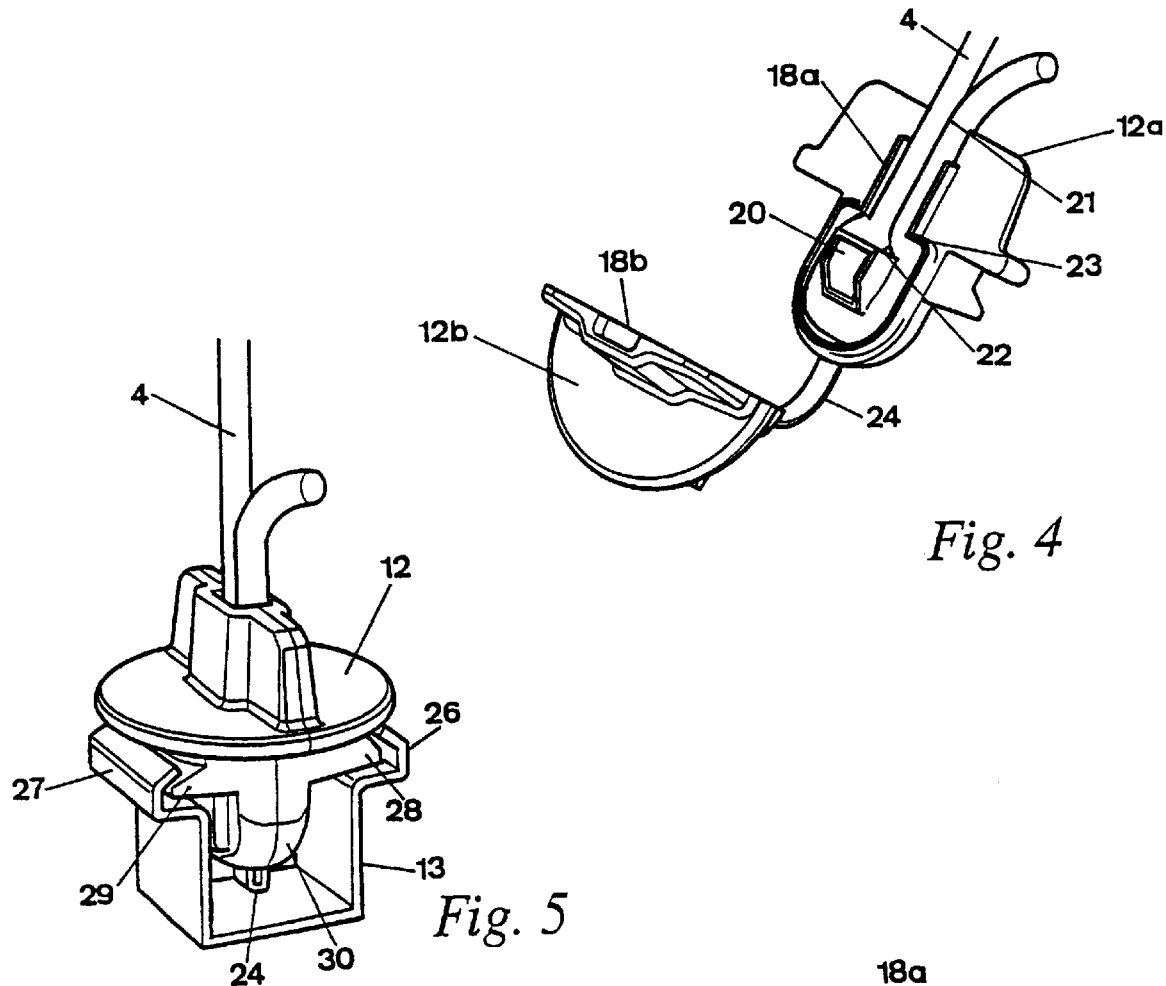

CORD-LOCKING DEVICE AND A MILKING UNIT REMOVAL DEVICE COMPRISING SUCH A CORD-LOCKING DEVICE

BACKGROUND OF THE INVENTION

1. Field of the Invention

The present invention refers to a cord-locking device for releasably gripping a cord, comprising a grip member arranged to receive the cord and be held releasably by a holding member.

Such a cord-locking device may be used for many purposes, preferably it may be used as a safety coupling, wherein the grip member of the cord-locking device and the holding member may be pulled apart when the coupling device is subjected to great pulling loads.

2. Description of the Prior Art

An example of an application field is milking machines provided with a device for automatic removal of a milking member from the teats of the animal which is milked. For such removing devices, an air cylinder having a movable piston which via a cord is connected to the milking member is usually utilized. Sometimes, it happens that the cow tries to kick off the milking member, wherein the legs may get entangled in the cord. In order to solve this problem, it is known to utilize a safety device which in case of large loads releases the cord, wherein injuries on the cows and damage to the milking members may be avoided.

Such a safety device is known from SE,B,453 217, which comprises a coupling device which may be pulled apart as a consequence of large loads. The coupling device comprises male and female members which may be screwed together. Cords are attached to a respective member through holds and maintained by knots provided on the cords. The disadvantage of this device is that the loosely hanging member parts may cause injuries on the cows and the milking members when the coupling device is pulled apart. Moreover, said knots may get stuck on inappropriate locations and cause injuries.

A cord-locking device is previously known from WO95/05733, which comprises a grip member arranged to receive the cord and to be loosely held by a holding member. The grip member comprises a through-going hole in which the cord is fastened by a knot. When the grip member is pulled apart from the holding member, the grip member will also in this case hang on the lose cord and cause injuries on cows and damage to the milking equipment.

SUMMARY OF THE INVENTION

The purpose of the present invention is to provide a cord-locking device of the kind initially defined, by which the above-mentioned disadvantages of previously known cord-locking devices may be remedied to a large extent, and thereby eliminate the risks for injuries on cows and damage on the equipment of the milking machine when the cord is subjected to unusually large pulling loads. Furthermore, it is aimed a cord-locking device which enables releasable locking of an even cord, i.e. a cord which is not provided with knots or the like.

This object is obtained according to the invention by the features that the grip member, held by the holding member, is arranged to lock fixedly the received cord by clamping as a consequence of a pulling load applied to the cord, and that the grip member, when released from said holding member, is arranged to enable the release of the received cord from the grip member.

By this design, it is obtained that the cord in an essentially even state may be fastened in the grip member without knots and that, when the grip member is pulled off from the holding member, the received cord is released from the grip member which falls down to the ground and thereby does not constitute any risks for the cow and the milking device.

According to a preferred embodiment of the invention, the grip member comprises a passage for said receiving of the cord. Furthermore, the grip member may comprise a locking portion, which is arranged to lock fixedly the cord in the passage as a consequence of a pulling load applied to the cord. Preferably, the locking portion is resilient and displaceable in the grip member. By this design, it is possible to lock the cord in the passage of the grip member without any knots or other thickened portions of the cord.

According to a further embodiment of the invention, the grip member comprises a recess in which the locking portion is arranged in such a manner that the recess and the locking portion form said passage. The locking portion may here by arranged to be displaceable in such a manner that the cord is fixedly clamped between the locking portion and a part of the recess as a consequence of a pulling load applied to the cord. Preferably, the cord, received by the grip member, extends in said passage in a loop, which at least partly encloses the locking portion. Thereby, it is obtained that the locking portion automatically is displaced by the pull-loaded cord and the locking portion will thus lock the cord in the passage. Advantageously, the locking portion comprises at least one edge for locking the cord. A further safer locking is obtained if the recess comprises one or more edges in the proximity of the edge of said locking portion.

According to a further advantageous embodiment of the invention, the recess of the grip member comprises a common inlet and outlet portion, respectively, of the passage for the cord. Thereby, the recess of the grip member is designed in an advantageous manner and the cord may in a simple way be applied to said recess.

According to another advantageous embodiment of the invention, the grip member comprises at least two releasably connected parts, which parts are kept together by said holding member and form said passage in a connected state. When mounting the cord-locking device, the cord is initially introduced into one of said parts, thereafter said parts are brought together, wherein the cord is received in the passage so formed. Thereafter, the cord is fastened in the holding member. The holding member is designed in such a manner that it keeps said connected parts together. When the cord is subjected to an unusually large pulling load, the grip member is released from the holding member, whereby the loosely connected parts of the grip member are released from each other and the cord may thereby be released from the grip member. Since said grip member may be used several times, it is advantageous if the grip member is manufactured as a unit and may be kept together by a flexible material section. Thereby, the disadvantage of looking for several loose parts which have fallen down to the ground when the grip member is to be used again is remedied. For reasons of costs, it is suitable to manufacture the grip member of a plastic material.

According to another advantageous embodiment of the invention, said holding member comprises at least two clamping elements arranged to clamp fixedly, between each other, the grip member in a connected state. Advantageously, the clamping elements are arranged to be resilient. By this design of the holding members, the parts of a gripping member may be kept together by the resilient force of the clamping elements. The connecting resilient force may be dimensioned in such a manner that the grip member is released from the holding member only when applying unusually large pulling loads to the cord.

According to a preferred embodiment of the invention, the cord-locking device is comprised by a safety coupling for automatic removal of a milking member. The cord is arranged, via a removing member, to be connected to a milking member of a milking machine. According to a further embodiment of the invention, the cord-locking device is comprised by a removing device for automatic removal of a milking member, wherein the removing device comprises an operating cylinder with a movable piston and a cord, wherein one end of the cord is connected to said milking member and its other end is connected releasably to said cord-locking device, and the cord between its end points is displaceably provided by the movable piston of the operating cylinder. In this type of removing device having an operating cylinder, it is particularly important that the cord does not have any knots or other members, since the cord during the releasing process is to be pulled through thin passages and holes in the operating cylinder. If the cord is fastened in, for instance, the operating cylinder, it may be damaged as well as the rest of the milking equipment and the cow.

BRIEF DESCRIPTION OF THE DRAWINGS

In the following a preferred embodiment of the invention is described by way of example and with reference to the drawings attached, in which FIG. 1 discloses a cabinet in which the cord-locking device according to the invention is provided.

FIG. 4 discloses the grip member of the cord-locking device in an open position with an introduced cord.

FIG. 5 disclosed the grip member with the cord and a holding member.

FIG. 6 discloses the grip member in an open position without a cord.

DETAILED DESCRIPTION OF A PREFERRED EMBODIMENT OF THE INVENTION

Figure 1:
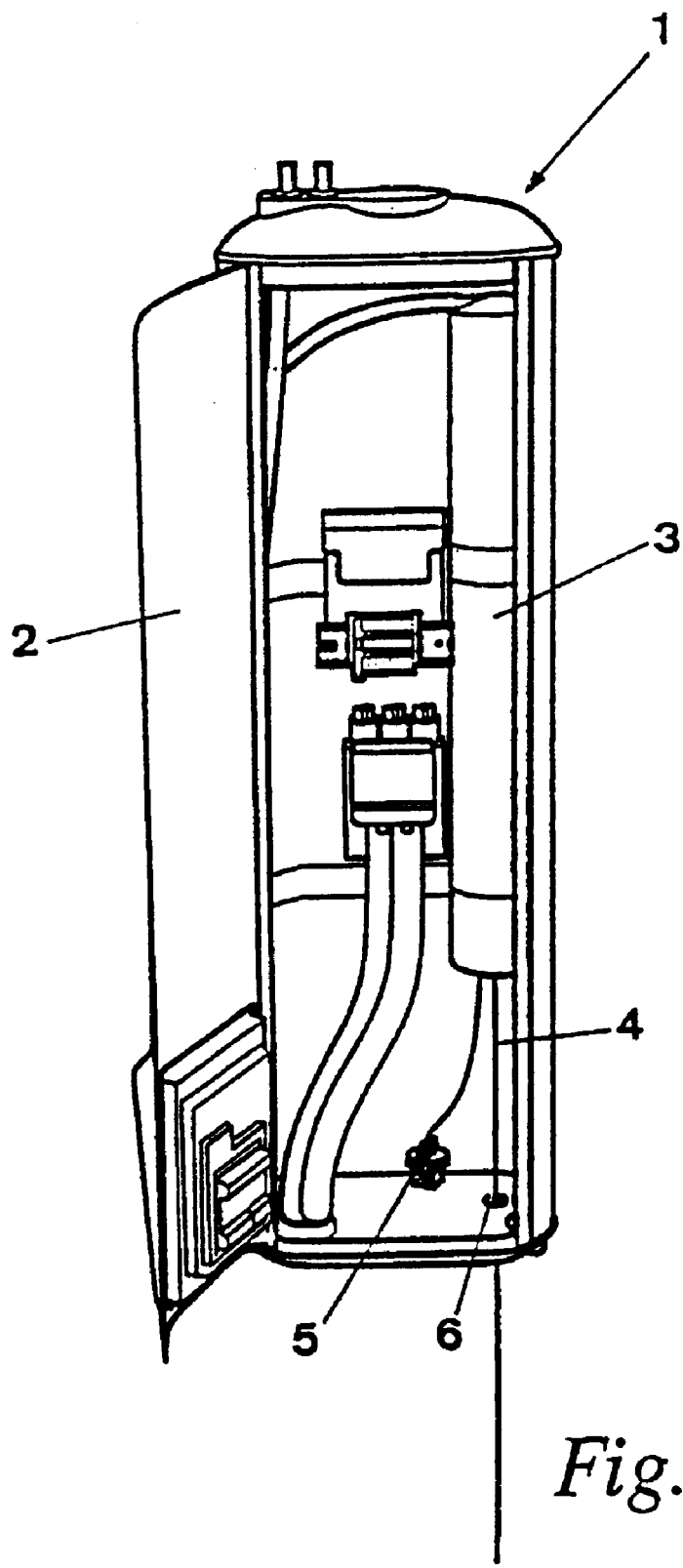

FIG. 1 discloses a cabinet 1 having a closable door 2. In the cabinet 1, an operating cylinder 3 is provided, which preferably is driven by air. The operating cylinder 3 acts on a cord 4 having an end which is releasably connected to a cord-locking device 5 and which extends through a hole 6 at the bottom of the cabinet 1. The cabinet 1 also comprises other equipment for the milking, which however is not to be described more closely herein.

Figure 2:
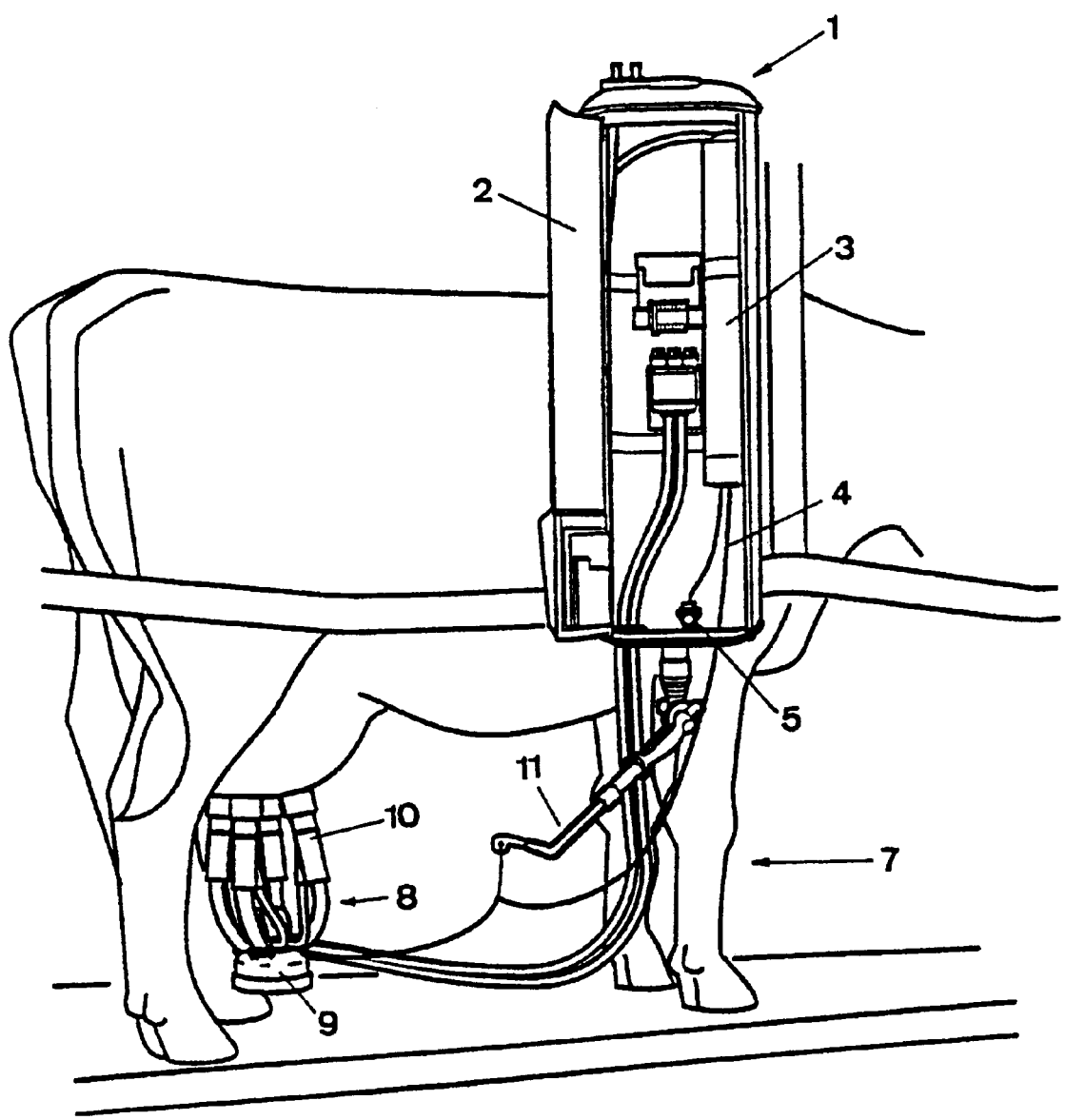
FIG. 2 discloses a part of a milking stall having the cabinet of FIG. 1.

FIG. 2 discloses the location of the cabinet 1 in a milking stall 7 which comprises a milking machine (not completely disclosed) with a milking member 8 comprising a claw 9 and four teatcups 10. Thus, the cord 4 is at one end releasably connected to the cord-locking device 5 and runs further through the operating cylinder 3 and out of the cabinet through a passage of a suspension member 11. The other end of the cord 4 is fixedly provided on the milking member 8. When removing the milking member 8 from the cow, the operating cylinder 3 acts on the cord 4 in such a manner that the milking member 8 is pulled towards the suspension member 11. It happens that the cow tries to kick off the milking member 8, wherein the rear legs may get entangled in said cord 4. In such a position, the cord-locking device 5 is released so that the cord 4 may run freely through the operating cylinder 3 and the hole 6 in the cabinet 1.

Figure 3:
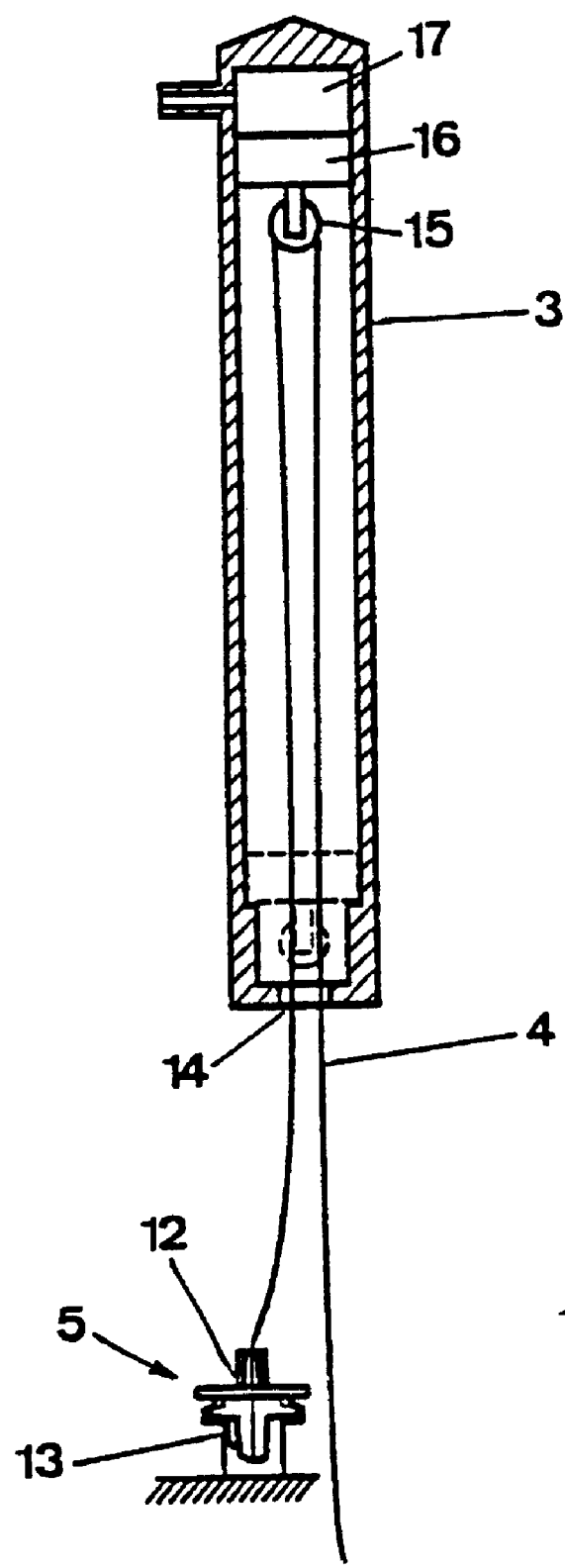
FIG. 3 discloses a cord-locking device together with an operating cylinder.

FIG. 3 discloses that one end of the cord 4 is gripped by a grip member 12 of the cord-locking device 5, which member is releasably held by a holding member 13. From the cord-locking device 5, the cord 4 runs through a hold 14 in the operating cylinder 3 about a pulley 15 which is fixedly attached to a movable piston 16 in the operating cylinder 3. Thereafter, the cord 4 again runs out through the hole 14 in the operating cylinder 3. In order to operate the cylinder 3, the vacuum pump (not disclosed) of the milking machine is utilized, in the example disclosed, to control the pressure level in a space 17 above the piston 16 via an outlet.

When removing the milking member 8, the operating cylinder is activated by the creation of a subpressure in the space 17, wherein the piston 16 with the fixedly arranged pulley 15 moves upwardly. During this movement, the cord runs over the pulley 15 and thereby pulls the milking member 8 connected to the cord 4.

The cord-locking device 5 is more closely disclosed in FIGS. 4–6. The grip member 12 comprises two parts 12a, 12b, each of which comprises a recess 18a, 18b. In the recess 18a, a locking portion 20 is arranged resiliently or elastically in a central position. When the parts 12a and 12b are in a connected position, see FIG. 5, the recesses 18a and 18b form together with the locking portion 20 a passage for the cord 4. During the introduction of the cord 4 in the grip member 12, the cord 4 is inserted in the recess 18a of the grip member part 12a and put in a loop around the locking portion 20. The recess 18a thereby comprises a common inlet and outlet portion 21 for the cord loop. The locking portion 20 comprises edges 22 and the recesses 18a, 18b comprise edges 23 provided in the proximity of the edges 22 of the locking portion. When the grip member parts 18a, 18b are brought together, the cord is gripped in the passage formed. The grip member parts 12a and 12b are connected to each other by a flexible material section 24 in such a manner that the grip member 12 constitutes a unit. The grip member 12 which has been brought together is fastened to the holding member 13 mentioned above in such a manner that said loosely connected parts 12a and 12b are held together by means of two clamping elements 26, 27 of the holding member 13. The holding member 13 is essentially designed as a U-shaped metal spring where the legs form the clamping elements 26, 27. The grip member 12, comprising two projections 28, 29 and a nose portion 30, is fastened in the holding member 13 by being introduced into the space between the clamping elements 26, 27 by means of said projection 28, 29 which are rotated about 90° in relation to the clamping element 26, 27 and the position disclosed in FIG. 5. When the projections 28, 29 of the grip member 12 are located at the same level as the clamping elements 26, 27 of the holding member 13, the grip member is rotated so that the clamping elements 26, 27 yield outwardly. When the grip member has been rotated about 90°, the projections 28, 29 and the clamping elements 26, 27 adopt a shape-defined fit. The projections 28, 29 and the clamping elements 26, 27 comprise co-operating obliquely upwardly directed surfaces so that the grip member 12 remains in the holding member 13 during usual pulling loads. During unusually large pulling loads, the outwardly directed surfaces of the projections 28, 29 press the corresponding surfaces of the clamping elements 26, 27 outwardly, wherein the grip member 12 may be released from the holding member 13. In order to secure in the grip that the grip member 12 is not displaced laterally to the holding member 13, a fixed element may (which does not appear from the figures) extend between the legs of the holding member 13, and in this area comprise a circular hold which is arranged to receive the nose portion 30 of the grip member 12. Thereby, it is prevented that the grip member 12 and the holding member 13 are displaced laterally when they are in engagement whereas they still may be rotated freely in relation to each other, i.e., the circular hole functions as a guiding for said rotary movement.

When the milking member 8 is removed by the cord 4 and the operating cylinder 3, a pulling load arises in the cord 4, wherein the cord 4 displaces the locking portion 20 in the pulling direction so that the edges 22 of the locking portion 20 and the edges of the recesses 18a, 18b approach each other and increase the clamping force by which the cord 4 is locked in the passage. Likewise, the parts 12a, 12b of the grip member 12 are held by clamping elements 26, 27 in such a manner that the cord 4 in normal cases is held in the cord-locking device 5 during the removing procedure.

If, for instance, the cow tries to kick off the milking member 8 and gets entangled with the rear leg in said cord 4, an unusually high pulling load arises in the cord 4. The grip member 12 will then be pulled out of the clamping elements 26, 27 of the holding member 13. Now, the two parts 12a, 12b of the grip member 12 have no connecting force, wherein the grip member 12 is opened in such a manner that the cord 4 will be released from the recess 18a. The released end of the cord 4 comprises neither knots nor any other members but may run freely through, for instance, the operating cylinder without getting stuck. Hereby, damage to the milking equipment and injuries to the cow are avoided.

The invention is of course not in any way limited to the preferred embodiments described above but may be varied within the scope of the claims. The cord-locking device may for instance be utilized in other applications than together with a removing member of a milking member. The expression cord refers in the present application to a longitudinal, flexible and preferably pliable material, for instance of textile and/or synthetic fibres. It is not to be excluded that the invention also is applicable to cord members, which are at least partly manufactured by a metallic material.

What is claimed is:

1. A cord-locking device for releasably gripping a cord, comprising:
   a holding member; and
   a grip member arranged to receive the cord and be held releasably by said holding member wherein the grip member, held by the holding member, is arranged to fixedly lock the received cord by clamping as a consequence of a first pulling load applied to the cord, wherein the grip member is arranged to be released from said holding member when the cord is subjected to a second pulling load which is greater than the first pulling load, and wherein the grip member, when released from said holding member, is arranged to enable the release of the received cord from the grip member.

2. A cord-locking device according to claim 1, wherein the grip member comprises a passage for receiving the cord.

3. A cord-locking device according to claim 2, wherein the grip member comprises a locking portion which is arranged to fixedly lock the cord in the passage as a consequence of the first pulling load being applied to the cord.

4. A cord-locking device according to claim 3, wherein said locking portion is resilient and displaceably provided in the grip member.

5. A cord-locking device according to claim 3, wherein the grip member comprises a recess in which the locking portion is arranged in such a manner that the recess and the locking portion form said passage.

6. A cord-locking device according to claim 4, wherein the grip member includes a recess and wherein the locking portion is arranged to be displaceable in such a manner that the cord is fixedly clamped between the locking portion and a part of the recess as a consequence of the first pulling load applied to the cord.

7. A cord-locking device according to claim 6, wherein the cord, received by the grip member, extends in said passage in a loop which at least partly encloses the locking portion.

8. A cord-locking device according to claim 7, wherein the recess has a common inlet and outlet portion for the passage for the cord.

9. A cord-locking device according to claim 3, wherein said locking portion comprises at least one edge for the locking cord.

10. A cord-locking device according to claim 9, wherein the grip member includes a recess and wherein the recess comprises at least one edge in the proximity of the edge of said locking portion.

11. A cord-locking device according to claim 2, wherein the grip member comprises at least two releasably connected parts, which parts are kept together by said holding member and form said passage in a connected state.

12. A cord-locking device according to claim 11, wherein said parts of the grip member are kept together by a flexible material section.

13. A cord-locking device according to claim 12, wherein the grip member is manufactured as a unit.

14. A cord-locking device according to claim 11, wherein the grip member is manufactured of a plastic material.

15. A cord-locking device according to claim 11, wherein said holding member comprises at least two clamping elements arranged to fixedly clamp, between each other, the grip member in a connected state.

16. A cord-locking device according to claim 15, wherein said clamping elements are arranged to be resilient.

17. A cord locking device according to claim 15, wherein the cord-locking device is adapted for use as a safety coupling for automatic removal of a milking member, wherein the cord, via a removing member, is arranged to be connected to a milking member of a milking machine.

18. In combination:
   a milking member;
   a removing member including an operating cylinder with a movable piston and a cord; and
   a cord-locking device including a holding member and a grip member arranged to receive the cord and be held releasably by said holding member, wherein the grip member, held by; the holding member, is arranged to fixedly lock the received cord by clamping as a consequence of a pulling load applied to the cord, and wherein the grip member is arranged to enable the release of the received cord from the grip member,
   wherein one end of the cord is connected to said milking member and its other end is connected releasably to said cord-locking device, and the cord between its end points is displaceably provided by the movable piston of the operating cylinder.

* * * * *